(12) United States Patent
Haynes et al.

(10) Patent No.: US 8,854,576 B2
(45) Date of Patent: Oct. 7, 2014

(54) SEMITRANSPARENT ELECTRONIC DEVICE

(75) Inventors: Marcus Jerome Haynes, Painted Post, NY (US); Matthew McGowan, Austin, TX (US); Timothy James Morton, Austin, TX (US); Paul Jay Tompkins, Geneva, NY (US); Donnell Thaddeus Walton, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 13/278,358

(22) Filed: Oct. 21, 2011

(65) Prior Publication Data

US 2013/0100379 A1    Apr. 25, 2013

(51) Int. Cl.
| | |
|---|---|
| *G02F 1/133* | (2006.01) |
| *G02F 1/13* | (2006.01) |
| *G02F 1/1333* | (2006.01) |
| *G02F 1/1347* | (2006.01) |

(52) U.S. Cl.
CPC ........ *G02F 1/133308* (2013.01); *G02F 1/1347* (2013.01)
USPC .................................... 349/73; 349/1; 349/58

(58) Field of Classification Search
USPC .......................................... 349/58, 73–74, 1
See application file for complete search history.

(56) References Cited

U.S. PATENT DOCUMENTS

| | | | | |
|---|---|---|---|---|
| 6,141,067 | A * | 10/2000 | Ikka | ................................ 349/65 |
| 7,538,482 | B2 * | 5/2009 | Li et al. | ........................ 313/501 |
| 2002/0008809 | A1 * | 1/2002 | Babuka et al. | .................. 349/73 |
| 2006/0256256 | A1 * | 11/2006 | Seong et al. | ..................... 349/73 |
| 2009/0290090 | A1 * | 11/2009 | Byoun et al. | .................... 349/58 |
| 2009/0321728 | A1 | 12/2009 | Seo | |
| 2011/0001746 | A1 | 1/2011 | Kim et al. | |
| 2011/0063542 | A1 * | 3/2011 | Park et al. | ....................... 349/62 |
| 2011/0080348 | A1 | 4/2011 | Lin et al. | |
| 2011/0141399 | A1 * | 6/2011 | Kim et al. | ....................... 349/64 |
| 2011/0175902 | A1 | 7/2011 | Mahowald | |
| 2011/0240448 | A1 * | 10/2011 | Springer et al. | ............. 200/331 |
| 2012/0140304 | A1 | 6/2012 | Kuhlman et al. | |
| 2012/0162490 | A1 | 6/2012 | Chung et al. | |
| 2013/0201176 | A1 | 8/2013 | Lee et al. | |

FOREIGN PATENT DOCUMENTS

WO    2010027565 A2    3/2010

OTHER PUBLICATIONS

"OLED: An emerging display technology." NEC Display Solutions of America, Inc. Jan. 2007.
Gorrn, Patrick, et al. "Towards See-Through Displays: Full Transparent Thin-Film Transistors Driving Transparent Organic Light-Emitting Diodes." Advanced Materials. 2006, 18, 738-741.
Wager, J. F., "68.1: Invited Paper: Transparent Electronics—Display Applications?" SID Symposium Digest of Technical Papers, 2007, vol. 38, issue 1, pp. 1824-1825.

* cited by examiner

*Primary Examiner* — Nathanael R Briggs
(74) *Attorney, Agent, or Firm* — Timothy M Schaeberle

(57) ABSTRACT

A semitransparent electronic device includes a glassy sheath having an internal cavity and a display unit disposed in the internal cavity. The display unit has an inner display area and an outer display area circumscribing the inner display area. A transparent display device included in the display unit provides at least the outer display area.

17 Claims, 6 Drawing Sheets

SEMITRANSPARENT ELECTRONIC DEVICE

BACKGROUND

The field of the invention relates to portable electronic devices having displays for conveying visual content to users.

U.S. Patent Publication No. 2011/0080348 discloses an electronic device having a primary display and a secondary display. The secondary display is disposed around the periphery of the primary display and has electroluminescent segments that can be independently illuminated.

U.S. Patent Publication No. 2011/0175902 discloses a layered display device capable of displaying data in three dimensions. The display device includes stacked front, middle, and rear display panels, where each of the panels can be a transparent or an opaque display device.

SUMMARY

In one aspect of the present invention, a semitransparent electronic device includes a glassy sheath having an internal cavity. The semitransparent electronic device further includes a display unit disposed in the internal cavity. The display unit has an inner display area and an outer display area circumscribing the inner display area. At least the outer display area is provided by a transparent display device included in the display unit.

In at least one embodiment, the glassy sheath has a frontside shell and a backside shell, which are joined at a seam. The interior surfaces of the frontside and backside shells define the internal cavity of the glassy sheath.

In at least one embodiment, the frontside shell has a curved exterior surface.

In at least one embodiment, the backside shell has a contoured exterior surface, which provides the glassy sheath with one or more handle nubs.

In at least one embodiment, the semitransparent electronic device further includes a protective band fitted around a circumference of the glassy sheath.

In at least one embodiment, the protective band is made of a non-glass material and is fitted around the seam between the frontside shell and the backside shell.

In at least one embodiment, the semitransparent electronic device further includes at least one processor disposed in the internal cavity, where the at least one processor is in communication with the display unit.

In at least one embodiment, the transparent display device provides only the outer display area, and the display unit further includes an additional display device that provides the inner display area.

In at least one embodiment, the transparent display device has a loop shape and the additional display device has a tablet shape.

In at least one embodiment, the additional display device is a transparent display or an opaque display device.

In at least one embodiment, the additional display device is an electroluminescent display device.

In at least one embodiment, the additional display device is a liquid crystal display device, and the display unit further includes a lighting device at a rear or an edge of the additional display device.

In at least one embodiment, the additional display device is a liquid crystal display device, and the display unit further comprises a reflective or semi-reflective layer at a rear of the additional display device.

In at least one embodiment, the transparent display device provides the outer display area and the inner display area.

In at least one embodiment, the semitransparent electronic device further includes a touch-sensitive interface associated with or formed on the display unit.

In at least one embodiment, the semitransparent electronic device further includes a memory device disposed in the internal cavity, the memory device being in communication with the at least one processor.

In at least one embodiment, the semitransparent electronic device further includes a wireless communications device disposed in the internal cavity.

In at least one embodiment, the semitransparent electronic device further includes a speaker disposed in the internal cavity or attached to the glassy sheath.

In at least one embodiment, the semitransparent electronic device further includes a battery.

In at least one embodiment, the semitransparent electronic device further includes an induction coil disposed in the internal cavity and coupled to the battery.

It is to be understood that both the foregoing general description and the following detailed description are exemplary of the invention and are intended to provide an overview or framework for understanding the nature and character of the invention as it is claimed. The accompanying drawings are included to provide a further understanding of the invention and are incorporated in and constitute a part of this specification. The drawings illustrate various embodiments of the invention and together with the description serve to explain the principles and operation of the invention.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

DETAILED DESCRIPTION

Figure 1A:
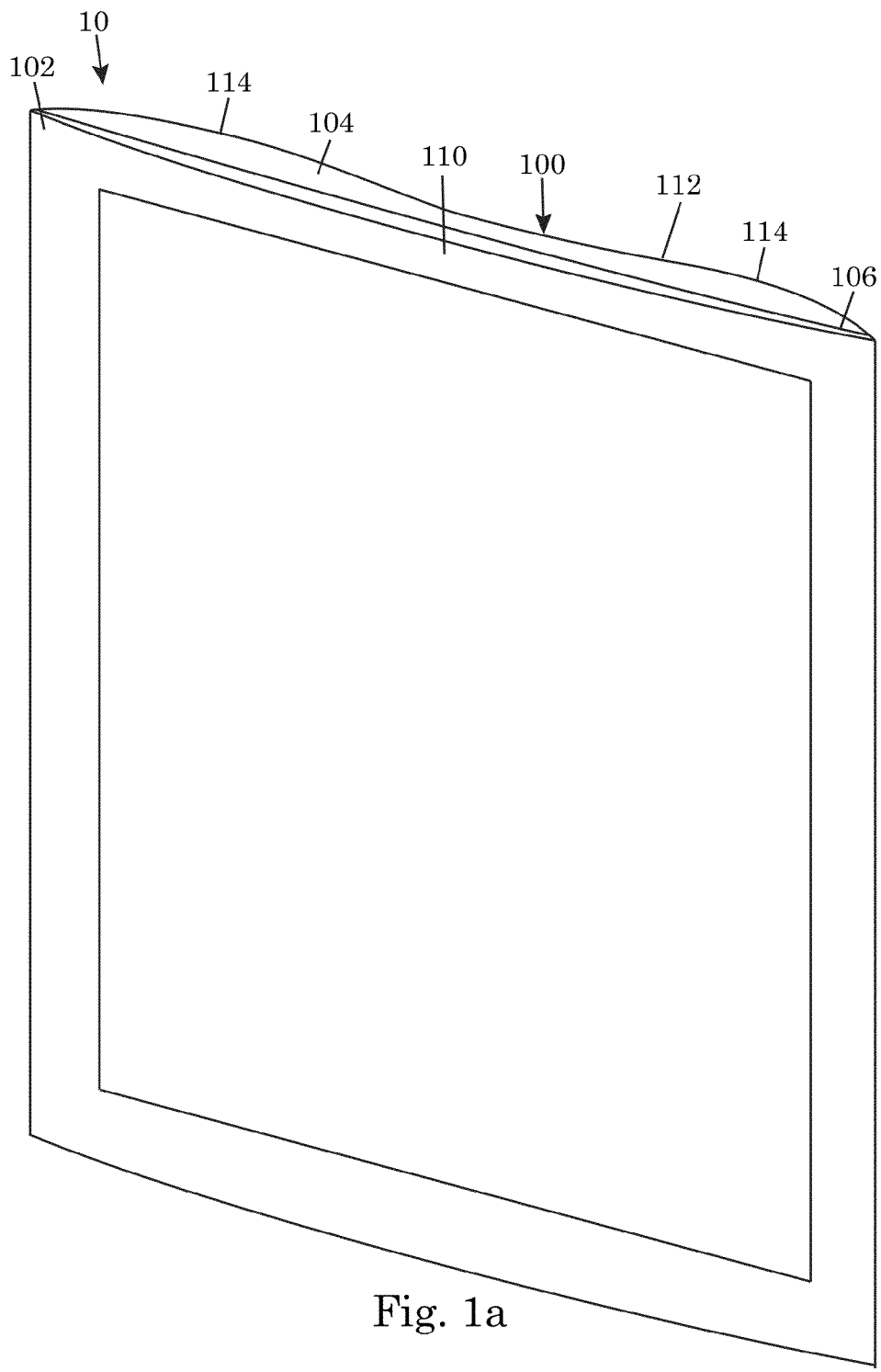
FIG. 1a shows a semitransparent electronic device.

In the following detailed description, numerous specific details may be set forth in order to provide a thorough understanding of embodiments of the invention. However, it will be clear to one skilled in the art when embodiments of the invention may be practiced without some or all of these specific details. In other instances, well-known features or processes may not be described in detail so as not to unnecessarily obscure the invention. In addition, like or identical reference numerals may be used to identify common or similar elements.

FIG. 1a shows a semitransparent electronic device 10 having a glassy sheath 100. The glassy sheath 100 has a frontside shell 102 and a backside shell 104. In one embodiment, the frontside shell 102 and the backside shell 104 are each made of a glass material. The glass material may be glass or glass-ceramic. The glass material of the frontside shell 102 may or may not be the same as the glass material of the backside shell 104. Preferably, the glass material of the frontside shell 102 is the same as that of the backside shell 104. Or, preferably, the coefficient of thermal expansion (CTE) of the glass material of the frontside shell 102 is similar to the CTE of the glass material of the back wall 104. The glass material of the frontside shell 102 and the glass material of the backside shell 104 are preferably strengthened chemically, e.g., by ion-exchange, and/or thermally, e.g., by annealing or tempering. In some embodiments, each of the frontside shell 102 and the backside shell 104 is transparent. In other embodiments, the frontside shell 102 is transparent while the backside shell 104 is semitransparent.

The frontside shell 102 and the backside shell 104 are joined at or near their circumferential edges, as indicated generally at the seam 106. The seam 106 would generally be unnoticeable from a casual inspection of the glassy sheath 100. Any suitable method for joining glass material surfaces together may be used to join the frontside shell 102 and the backside shell 104 at the seam 106. The joining method may or may not result in a hermetic seal at the seam 106. A protective band 108 (in FIG. 1b) may be fitted around the glassy sheath 100 to provide circumferential edge protection to the glassy sheath 100. The protective band 108 may be fitted around the seam 106. The protective band 108 may be made of a non-glass material such as a metal or a polymer. Any suitable means of retaining the protective band 108 on the glassy sheath 100 may be used, such as dimples on the front and backside shells 102, 104 that engage protuberances on the protective band 108, or vice versa, or even just by friction fitting.

Figure 1B:
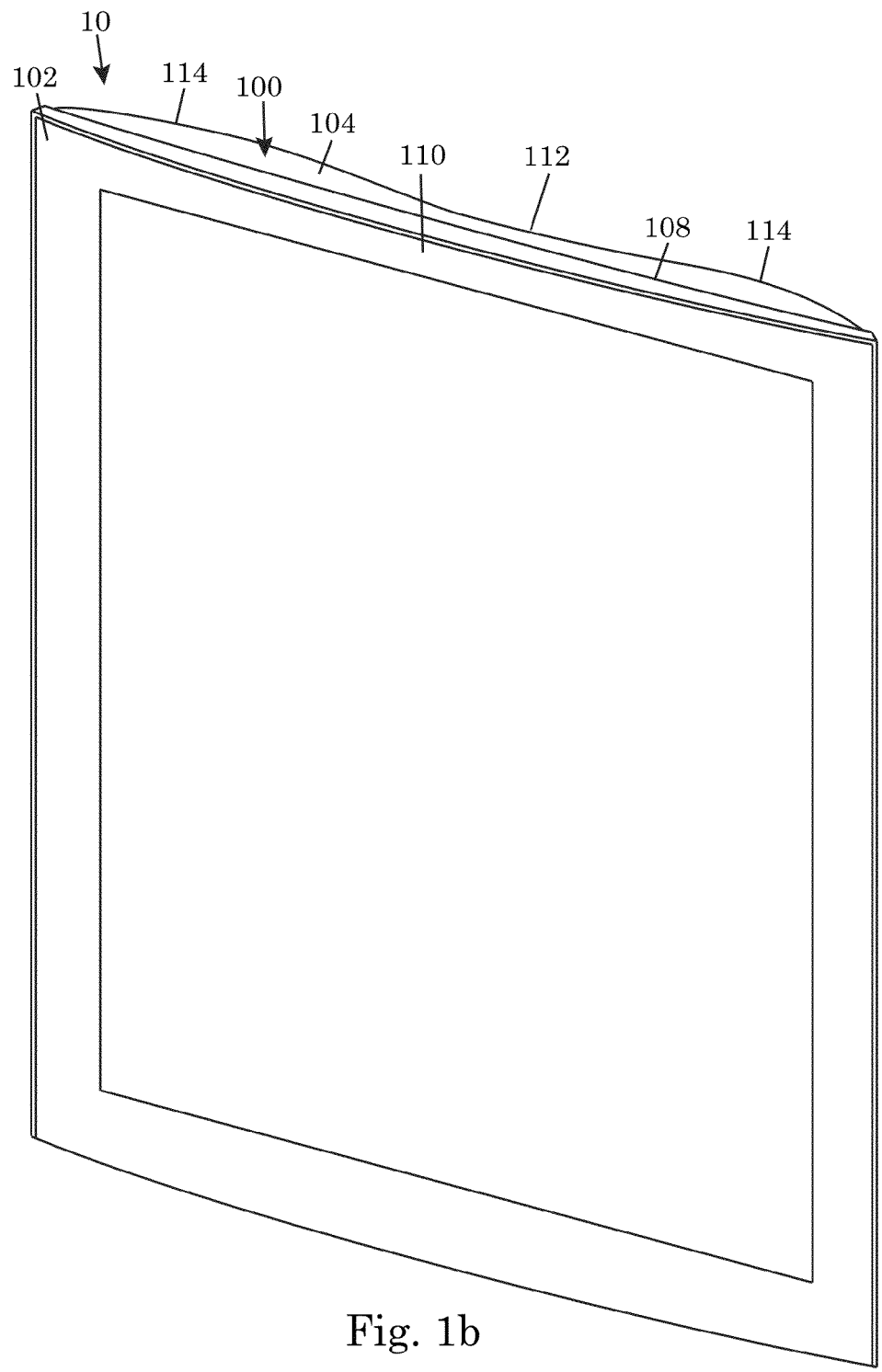
FIG. 1b shows a semitransparent electronic device with a protective band.
Figures 1C, 2A:
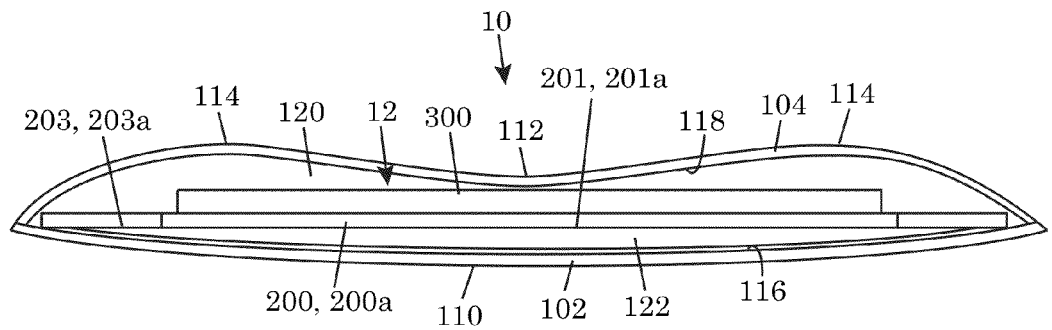
FIG. 1c shows a horizontal cross-section of a semitransparent electronic device.
FIG. 2a shows a dual-display display unit of a semitransparent electronic device.

The frontside shell 102 has a curved front surface 110, and the backside shell 104 has a contoured back surface 112, e.g., a wavy back surface. The contoured back surface 112 provides the glassy sheath 100 with handle nubs 114, which a user may use to grip the glassy sheath 100. The handle nubs 114 may have a variety of shapes, such as round, elongated, and L-shaped, depending on the contour used in the contoured back surface 112. In the embodiment shown in FIGS. 1a and 1b, the handle nubs 114 are elongated, with their major axes running along the length of the backside shell 104. In FIG. 1c, the interior surfaces 116, 118 of the frontside shell 102 and backside shell 104, respectively, are opposing and define a cavity 120 for holding the innards, generally indicated at 12, of the semitransparent electronic device 10. FIGS. 1a-1c show specific shapes of the frontside shell 102 and backside shell 104. Other shapes besides those shown in FIGS. 1a-1c are possible for the frontside shell 102 and backside shell 104, provided the shapes are complementary and define a cavity for holding the innards of the electronic device 10.

In FIG. 1c, the innards 12 of the electronic device 10 include a display unit, generally indicated at 200. In one embodiment, as shown in FIG. 2a, the display unit 200 has an inner display device 202, which provides an inner display area 201, and an outer display device 204, which provides an outer display area 203. The inner display device 202 and the outer display device 204 can function independently. For example, the inner display device 202 can be turned off without the outer display device 204 being turned off, or vice versa. The outer display device 204 circumscribes the inner display device 202. The inner display device 202 may have a tablet shape, and the outer display device 204 may have a loop shape or may have segments arranged in a loop shape. In one physical implementation of the semitransparent electronic device 10, which is not to be construed as limiting, the inner display area 201 can range from 7 inches to 10.1 inches, measured diagonally. The outer display area 203 can encompass the inner display area by at least 1 to 2 inches to allow for widget and notification to be displayed on the outer display area 203.

When the display unit 200 of FIG. 2a is disposed in the glassy sheath cavity 120 (in FIG. 1c), the inner display area 201 provided by the inner display device 202 and the outer display area 203 provided by the outer display device 204 are both viewable through the frontside shell 102 (in FIG. 1c). In one embodiment, the arrangement of the inner display device 202 and the outer display device 204 is such that the inner display area 201 and outer display area 203 are on the same plane and appear to be contiguous with each other. The inner display device 202 and outer display device 204 may be driven by a single driver circuit or by different driver circuits. The drive circuit(s) may have a loop shape or a linear shape and may be nested or arranged between the inner display device 202 and the outer display device 204, such as indicated generally at 208. The dashed lines are to indicate that the driver unit(s) generally won't be viewable from the frontside shell 102, i.e., when the display unit 200 is disposed in the glassy sheath 100 (in FIG. 1c).

In one embodiment, the inner display device 202 is an opaque display device and the outer display device 204 is a transparent display device. In another embodiment, both the inner display device 202 and outer display device 204 are transparent display devices. The inner display device 202 and the outer display device 204 may use any suitable display technology, such as liquid crystal display (LCD), organic light emitting diodes (OLED) or other electroluminescent display technology, and plasma display technology. In one embodiment, the inner display device 202 is selected from a transparent LCD device, an opaque LCD device, a transparent OLED device, an opaque top-emitting OLED device, and a reflective top-emitting OLED device.

Figure 2B:
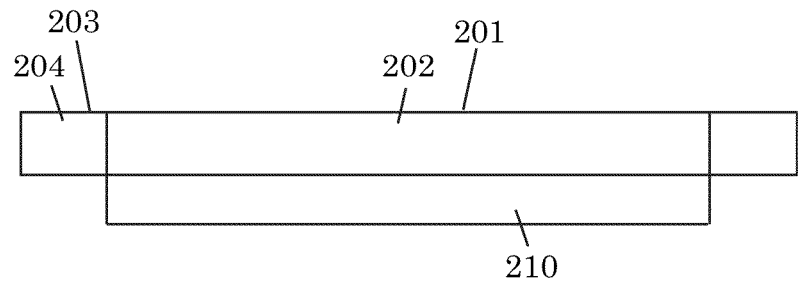
FIG. 2b shows a reflective layer at the back of a display device of a dual-display display unit.
Figure 2C:
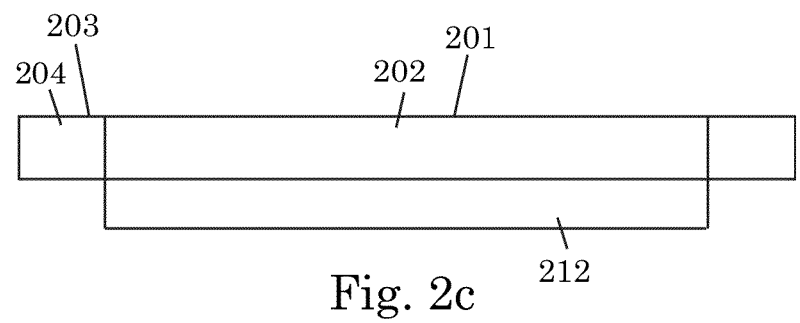
FIG. 2c shows backlight at the back of a display device of a dual-display display unit.
Figure 2D:
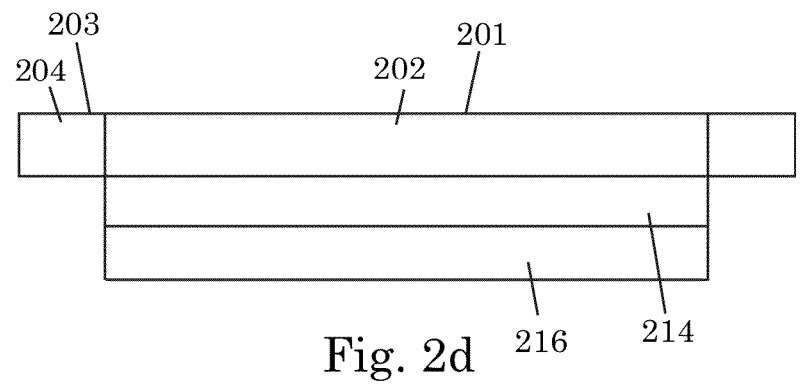
FIG. 2d shows backlight and a semi-reflective layer at the back of a display device of a dual-display display unit.
Figure 2E:
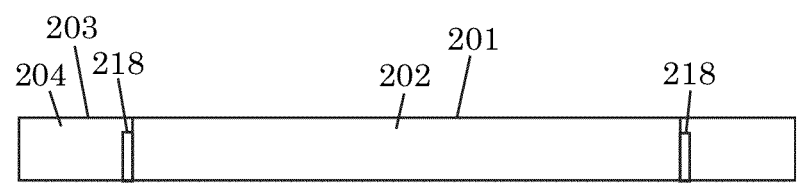
FIG. 2e shows sidelight at an outer edge of a display device of a dual-display display unit.

If the inner display device 202 is a LCD device operating in the reflective mode, the display unit 200 may include a reflective layer 210 (in FIG. 2b) at the rear of the inner display device 202. If the inner display device 202 is a LCD device operating in the transmissive mode, the display unit may include a lighting device 212 (in FIG. 2c) at the rear of the inner display device 202. If the inner display device 202 is a LCD device operating in the transflective mode, the display unit 200 may include a semi-reflective layer 214 (in FIG. 2d) at the rear of the inner display device 202 and a lighting device 216 (in FIG. 2d) at the rear of the semi-reflective layer 216. If the inner display device 202 is a transparent LCD, the display unit 200 may include a lighting device 218 (in FIG. 2e) at the edge of the inner display device 202 or may include a lighting device at the rear of the inner display device 202 (similar to what is shown at 212 in FIG. 2c) or may include an opaque reflective layer at the rear of the inner display device 202.

The inner display device 202 and the outer display device 204 interact with each other through icons or notifications that are passed between the inner display device 202 and the outer display device 204. The outer display device 204 can project notifications to the user, via the outer display area 203, without the user actively interacting with the outer display device 204. In one embodiment, the interface between the inner display area 201 and the outer display area 203 is seamless so that icons can be moved between the inner display area 201 and the outer display area 203. In embodiments where the outer display device 204 is transparent, icons or notifications displayed in the outer display area 203 will be visible from the frontside shell 102 (in FIG. 1c) and the backside shell 104 (in FIG. 1c). Visual content displayed in the inner display area 203 will generally only be visible from the frontside shell 102. In one embodiment, a touch-sensitive interface 122 (in FIG. 1c) is formed on otherwise integrated with the display devices 202, 204. The touch-sensitive interface 122 includes touch-sensitive devices, such as touch-sensitive capacitive buttons, that allow the display areas 201, 203 of the display devices 202, 204 to function as touch screens. Interaction with the touch-sensitive interface 122 will generally be through the frontside shell 102.

Figure 2F:
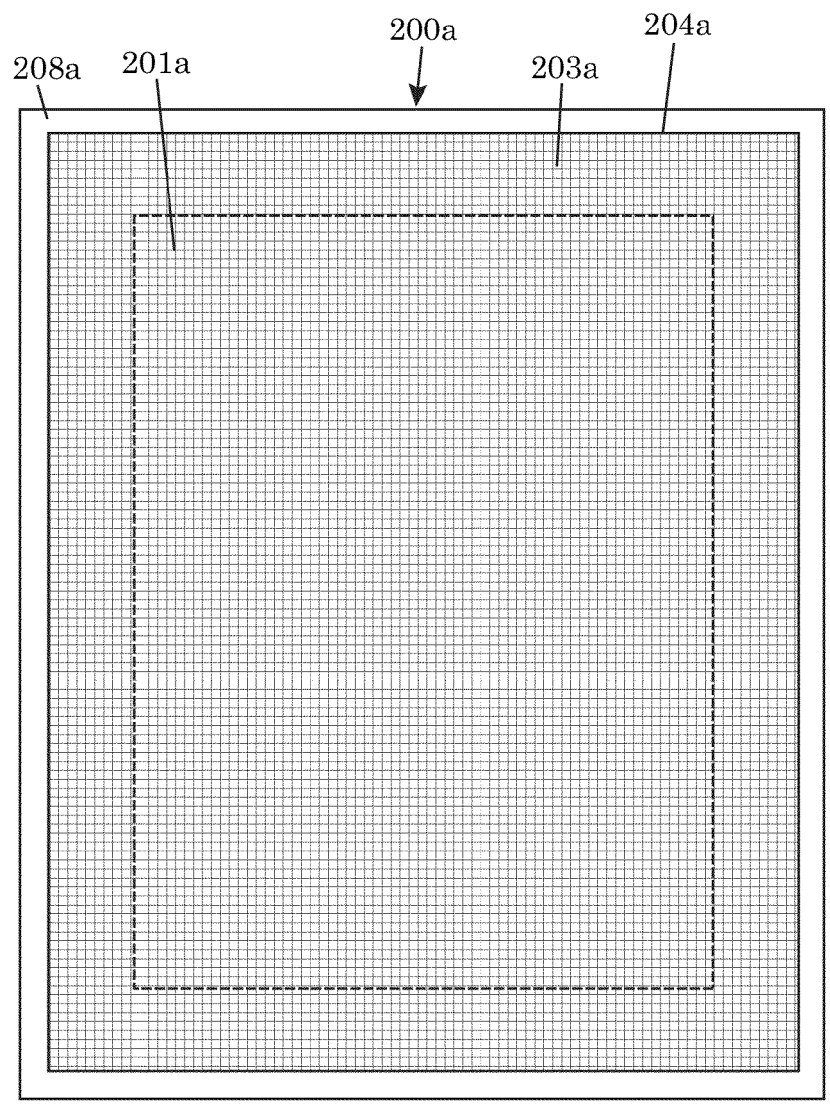
FIG. 2f shows a single-display display unit.

FIG. 2f shows an alternate display unit 200a with a single display device 204a providing an inner display area 201a and an outer display area 203a. Pixels in the single display device 204a corresponding to the inner display area 201a are responsible for displaying visual content in the inner display area 201a. Pixels in the single display device 204a corresponding to the outer display area 203a are responsible for displaying visual content in the outer display area 203a. Software is used to selectively turn on the pixels in the single display device 204a to display visual content in the inner display area 201a and outer display area 203a. Content can be selectively displayed or hidden in either of the inner display area 201a and outer display area 203a so that it appears that the single display device 204a is made of two functionally separate display devices, each corresponding to one of the display areas 201a, 203a. The inner display area 201a is nested within the outer display area 203a. The outer display area 203a may have a loop shape, while the inner display area 201a may have a tablet shape. The inner display area 201a will generally be contiguous with the outer display area 203a. The drive unit 208a for the single display device 204a may be situated at the periphery of the single display device 204a. In this case, an opaque coating may be applied along a border of the frontside shell 102 (in FIGS. 1a-1c) to cover the drive unit.

Figure 2G:
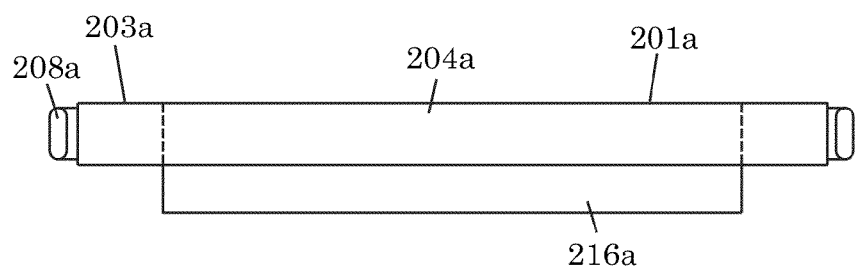
FIG. 2g shows backlight at the back of the display device of a single-display display unit.

In the alternate display unit 200a, the single display device 204a is a transparent display and may use any of the transparent display technologies mentioned above or known in the art. In one embodiment, the single display device 204a is selected from a transparent LCD device and a transparent OLED display device. If the single display device 204a is a transparent LCD device, the display unit 200a may include a lighting device 216a (in FIG. 2g) at the rear of the single display device 204a. The lighting device 216a, if used, is preferably confined to the portion of the rear of the single display device 204a corresponding to the inner display area 201a, i.e., the lighting device 216a need not extend to the portion of the rear of the single display device 204a corresponding to the outer display area 203a. The lighting device 216a will hide the electronics behind the single display device 204a during use of the semitransparent electronic device 10 (in FIGS. 1a-1c).

In FIG. 1c, the innards 12 of the semitransparent electronic device 10 further include an electronics unit 300, situated generally at the rear of the display unit 200 or between the display unit 200 and the backside shell interior surface 118. The electronics unit 300 is connected to (or in communication with) the display unit 200 (200a) and through this connection provides the visual content that is displayed on the display devices of the display unit 200 (200a) as well as direction on where to display the visual content, i.e., which display device to use in the case of the dual-display display unit 200 or which area of the display device to use in the case of the single-display display unit 200a. The electronics unit 200 may be confined generally behind the inner display area 201 (201a) and hidden from view through choice of the display device providing the inner display area 201 (201a) or through use of lighting or reflective layer behind the display device providing the inner display area 201 (201a).

Figure 3:
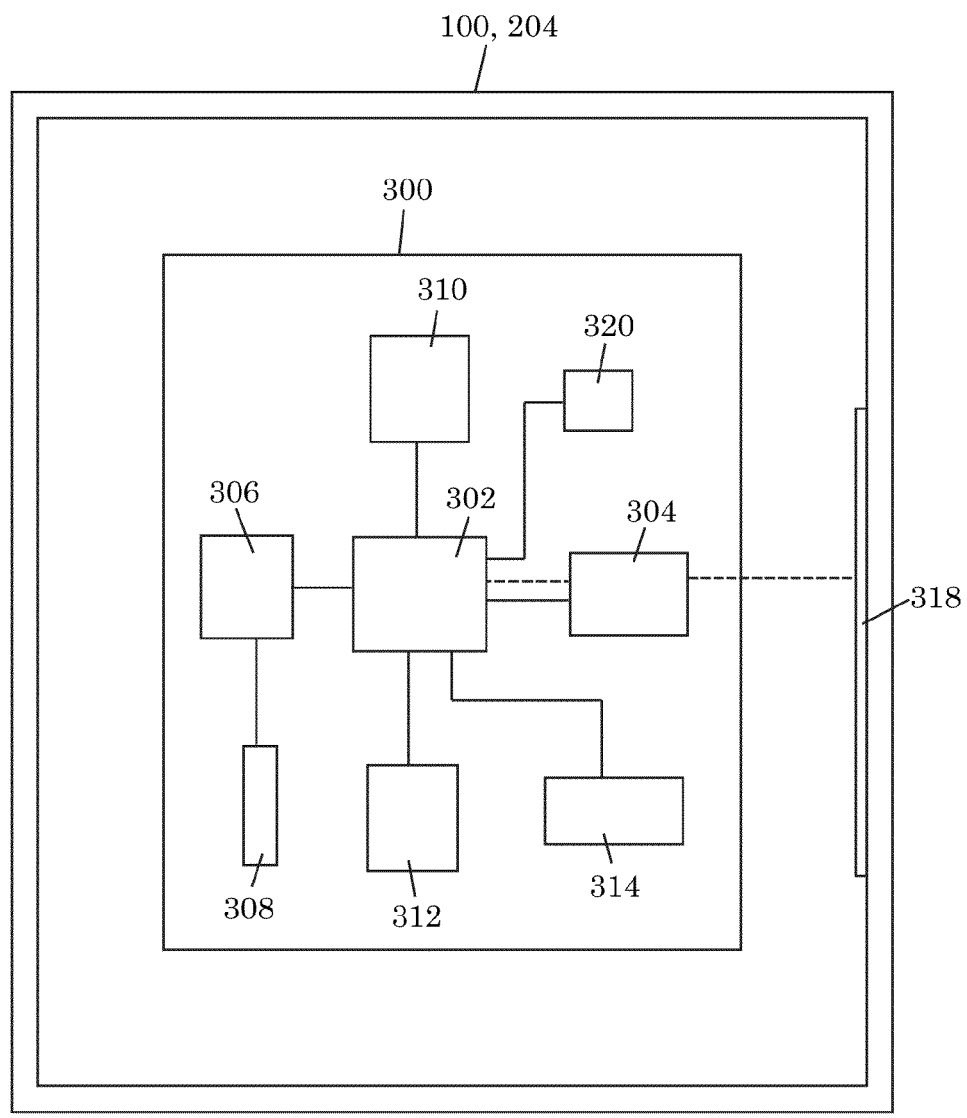
FIG. 3 shows a block diagram of an electronics unit of a semitransparent electronic device.

The configuration of the electronics unit 300 will depend in part on the intended use and desired functional features of the semitransparent electronics device 10. In general, as shown in FIG. 3, the electronics unit 300 will include a processor 302 for executing computer instructions, memory device(s) 304 for storing data and software, and battery 306 for storing and providing electrical power. In one embodiment, the battery 306 is charged by inductive charging. For this embodiment, the electronics unit 300 includes an induction coil 308, which can interact with an external induction coil to charge the battery 306. The electronics unit 300 may further include wireless communications device(s) 310, e.g., any combination of 3G/4G cellular antenna or other GPS antenna, WiFi antenna, and Bluetooth device. The electronics unit 300 may further include other devices such as a camera 312 and speaker 314. Alternatively, a speaker may be attached to or embedded in the glassy sheath 100 (in FIGS. 1a-c). FIG. 3 shows speaker 316 attached to the backside shell 104, as an example. This will allow the glassy sheath 100 to function as a speaker. The electronics unit 300 may further include one or more orientation sensors 320, e.g., accelerometers. The orientation sensors 320 may be used to sense the orientation of the semitransparent electronic device 100 (in FIG. 1c) and cause a change in the display orientation of the display devices of the display unit 200 (in FIG. 1c).

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A semitransparent electronic device, comprising:
   a glassy sheath made of glass or glass-ceramic and having an internal cavity; and
   a display unit disposed in the internal cavity such that the display unit is enclosed by the glassy sheath, the display unit comprising an inner display device providing an inner display area for dynamically displaying visual content and an outer display device having a loop shape providing an outer display area for dynamically displaying visual content, the inner display device and outer display device being capable of functioning independently, the outer display device circumscribing the inner display device such that both the outer display area and inner display area are viewable from a front surface of the glassy sheath, the outer display device being a transparent display device and the inner display device being an opaque display device.

2. The semitransparent electronic device of claim 1, wherein the glassy sheath comprises a frontside shell and a backside shell, the frontside and backside shells being joined at a seam, wherein interior surfaces of the frontside and backside shells define the internal cavity.

3. The semitransparent electronic device of claim 2, wherein the frontside shell has a curved exterior surface.

4. The semitransparent electronic device of claim 2, wherein the backside shell has a contoured exterior surface, the contoured exterior surface providing the glassy sheath with one or more handle nubs.

5. The semitransparent electronic device of claim 2, further comprising a protective band fitted around a circumference of the glassy sheath.

6. The semitransparent electronic device of claim 5, wherein the protective band is made of a non-glass material and is fitted around the seam.

7. The semitransparent electronic device of claim 1, further comprising at least one processor disposed in the internal cavity, the at least one processor being in communication with the display unit.

8. The semitransparent electronic device of claim 1, wherein the inner display device has a tablet shape.

9. The semitransparent electronic device of claim 1, wherein the inner display device is an electroluminescent display device.

10. The semitransparent electronic device of claim 1, wherein the inner display device is a liquid crystal display, and wherein the display unit further comprises a lighting device at a rear or an edge of the inner display device.

11. The semitransparent electronic device of claim 1, wherein the inner display device is a liquid crystal display, and wherein the display unit further comprises a reflective or a semi-reflective layer at a rear of the inner display device.

12. The semitransparent electronic device of claim 7, further comprising a touch-sensitive interface associated with the display unit.

13. The semitransparent electronic device of claim 7, further comprising a memory device disposed in the internal cavity, the memory device being in communication with the at least one processor.

14. The semitransparent electronic device of claim 7, further comprising at least one of a wireless communications device and an orientation sensor disposed in the internal cavity.

15. The semitransparent electronic device of claim 7, further comprising a speaker disposed in the internal cavity or attached to the glassy sheath.

16. The semitransparent electronic device of claim 7, further comprising a battery.

17. The semitransparent electronic device of claim 16, further comprising an induction coil disposed in the internal cavity and coupled to the battery.

* * * * *